US011822029B2

(12) United States Patent
Hong et al.

(10) Patent No.: US 11,822,029 B2
(45) Date of Patent: Nov. 21, 2023

(54) METHOD AND SYSTEM TO DETERMINE THE AZIMUTHAL ORIENTATION OF BOREHOLE SEISMOMETER SENSOR USING LONG PERIOD SURFACE WAVES IN MICROSEISMS

(71) Applicant: UIF (University Industry Foundation), Yonsei University, Seoul (KR)

(72) Inventors: Tae-Kyung Hong, Goyang-si (KR); Seongjun Park, Seoul (KR)

(73) Assignee: UIF (UNIVERSITY INDUSTRY FOUNDATION), YONSEI UNIVERSITY, Seoul (KR)

( * ) Notice: Subject to any disclaimer, the term of this patent is extended or adjusted under 35 U.S.C. 154(b) by 1 day.

(21) Appl. No.: 17/709,832

(22) Filed: Mar. 31, 2022

(65) Prior Publication Data

US 2023/0176241 A1 Jun. 8, 2023

(30) Foreign Application Priority Data

Dec. 7, 2021 (KR) .................. 10-2021-0173356

(51) Int. Cl.
*G01V 1/30* (2006.01)
*G01V 1/28* (2006.01)
(52) U.S. Cl.
CPC ............ *G01V 1/30* (2013.01); *G01V 1/288* (2013.01)
(58) Field of Classification Search
None
See application file for complete search history.

(56) References Cited

U.S. PATENT DOCUMENTS 7,408,836 B2 * 8/2008 Muyzert ............... G01V 1/303
367/54

FOREIGN PATENT DOCUMENTS

KR 101949419 2/2019

* cited by examiner

Primary Examiner — Roy Y Yi
Assistant Examiner — Geoffrey T Evans
(74) Attorney, Agent, or Firm — NORTON ROSE FULBRIGHT US LLP (57) ABSTRACT

The present invention is a method to determine an azimuthal orientation of a borehole seismometer sensor performed by a computing device using a control server having a database and an arithmetic function, the computing device performing a method to determine the azimuthal orientation of a borehole seismometer sensor using long-period surface waves in microseisms, including step S100 in which a data collection unit 100 collects continuous waveform data recorded by a borehole seismometer and a reference seismometer; step S200 in which a frequency band setting unit 200 sets a frequency band to be analyzed in the collected continuous waveform data; step S300 in which a filtering unit 300 performs bandpass filtering on the frequency band to be analyzed; step S400 in which a waveform dividing unit 400 divides seismic waveform into waveform segments with preset time units; step S500 in which a phase shift unit 500 shifts the phase of the divided vertical component waveforms by 90°; step S600 in which a waveform calculation unit 600 combines the divided N' and E' component seismic waveforms to calculate horizontal components for rotation angles waveform between 0 and 360° from the N' orientation; step S700 in which a correlation calculation unit 700 calculates a correlation coefficient between the horizontal and vertical component waveforms; step S800 in which a Rayleigh wave orientation determination unit 800 repeats steps S500 to S700 for each divided time domain; step S900

(Continued)

in which an orientation comparison unit 900 performs steps S400 to S800, respectively, with respect to the borehole seismometer data for which the sensor orientation is to be determined and the reference seismometer data for which the sensor orientation is already known; and step S1000 in which a result calculation unit 1000 averages θ determined for each time period to calculate a final result.

13 Claims, 9 Drawing Sheets

METHOD AND SYSTEM TO DETERMINE THE AZIMUTHAL ORIENTATION OF BOREHOLE SEISMOMETER SENSOR USING LONG PERIOD SURFACE WAVES IN MICROSEISMS

CROSS-REFERENCE TO RELATED APPLICATION

This application claims priority to and the benefit of Korean Patent Application No. 10-2021-0173356, filed on Dec. 7, 2021, the disclosure of which is incorporated herein by reference in its entirety.

TECHNICAL FIELD

The present invention relates to a method and a system to determine the azimuthal orientation of a borehole seismometer sensor. Particularly, the present invention relates to a method and a system to determine the azimuthal orientation of a borehole seismometer sensor using long-period surface waves in microseisms.

BACKGROUND

A seismometer is a device for recording the shaking of the ground. The seismogram recorded in the seismometer is used to investigate the structure, properties, and various activities of the underground. These data are one of the most important basic data in geology and seismology in terms of academics. For important non-academic uses, there are regular observation and early warning of seismic activity, and site survey for construction.

Ambient seismic noise is also recorded in seismometer recordings, which can act as a source of contamination to mask important signals to be detected (e.g., seismic signals, etc.). Therefore, ambient seismic noise, especially generated from the ground surface, significantly interferes with high-quality seismic wave recording. Deep underground is a very suitable environment for recording seismic waves because the intensity of ambient seismic noise generated from the ground surface is lowered. Accordingly, the installation of deep borehole seismometers is widely used.

Seismometers installed on the ground surface can easily set the orientation by visually checking the compass for the sensor's orientation (for example, east-west, south-north, vertical orientation). However, the borehole seismometer cannot determine the orientation of the sensor placed in the borehole due to the nature of the installation process. Therefore, after installing the borehole seismometer, measuring the orientation in which the sensor is placed is of the utmost priority, and it is very important for the smooth use of the sensor. However, an efficient method has not been proposed so far, and the orientation determination of the deep borehole seismometer sensor remains a very difficult task.

In the case of Korean Patent Registration No. 10-1949419, which is a prior art, it relates to a device for rotating a seismometer sensor in a borehole in a desired orientation, and corresponds to a device used to align the sensor in the north orientation after the laying orientation of the borehole seismometer sensor is determined.

A major problem of the related art is that it utilizes seismic waves generated from earthquakes. This analysis requires seismic waves with clear polarization directions to be recorded simultaneously at both surface and borehole seismometers.

If the seismic waves are not strong enough, the ambient seismic noise can cause errors in the analysis. In addition, there is a problem of waiting for a sufficiently large earthquake to be used for analysis, and additional seismometers need to be installed on the ground surface.

It is impossible to estimate the orientation of the seismometer before the occurrence of an earthquake, and there are many restrictions on the use of this method in environments where large earthquakes do not occur frequently, such as in the Korean Peninsula. As a complementary method, seismic waves can be generated through artificial blasting, but as described above, large blasting is required to record a sufficiently strong seismic wave, so it is difficult to use in large urban areas.

In particular, since additional seismometers are required on the ground surface of the borehole, additional costs are inevitable.

On the other hand, the present invention is different in that it is not a technical configuration for determining an orientation in which a sensor is placed, but a technical configuration for estimating an orientation in which a borehole seismometer is placed.

Measuring the orientation of a borehole seismometer is an important task, and various techniques have been proposed in the past, but include various problems. The present invention proposes an advanced method to determine the orientation of a borehole seismometer.

The above information disclosed in this Background section is only for enhancement of understanding of the background of the invention and it may therefore contain information that does not form the prior art that is already known to a person of ordinary skill in the art.

SUMMARY

The method and system to determine the azimuthal orientation of a borehole seismometer sensor using long-period surface waves in microseisms according to the present invention have the following technical problems.

First, it is intended to estimate the orientation of the borehole seismometer sensor without the occurrence of earthquakes as a condition.

Second, it is intended to estimate the orientation of the borehole seismometer sensor without installing an additional seismometer.

The technical problems of the present invention are not limited to those mentioned above, and other technical problems not mentioned will be clearly understood by those of ordinary skill in the art from the following description.

The present invention is a method to determine an azimuthal orientation of a borehole seismometer sensor performed by a computing device using a control server having a database and an arithmetic function, and the computing device may perform a method to determine the azimuthal orientation of a borehole seismometer sensor using long-period surface waves in microseisms, including step S100 in which a data collection unit collects continuous waveform data recorded by a borehole seismometer and a reference seismometer; step S200 in which a frequency band setting unit sets a frequency band to be analyzed in the collected continuous waveform data; step S300 in which a filtering unit performs bandpass filtering on the frequency band to be analyzed; step S400 in which a waveform dividing unit divides seismic waveform into waveform segments; step S500 in which a phase shift unit shifts the phase of the divided vertical component waveforms by 90°; step S600 in which a waveform calculation unit combines the divided N' and E' component seismic waveforms to calculate horizontal component waveforms for rotation angles between 0 and 360° from N' orientation; step S700 in which a correlation calculation unit calculates a correlation coefficient between the horizontal and vertical component waveforms; step S800 in which a Rayleigh wave orientation determination unit repeats steps S500 to S700 for each divided time domain; step S900 in which an orientation comparison unit performs steps S400 to S800, respectively, with respect to the borehole seismometer data for which the sensor orientation is to be determined and the reference seismometer data for which the sensor orientation is already known; and step S1000 in which a result calculation unit averages θ determined for each time period to calculate a final result.

In the present invention, in step S100, the continuous waveform data may be three-component continuous waveform data.

In the present invention, in step S200, the frequency band to be analyzed may include a frequency band having a lot of microseism energy.

In the present invention, in step S300, the filter used for bandpass filtering may include a Butterworth filter and a Gaussian filter.

In the present invention, in step S400, the length of the divided seismic waveform may be set according to the analyzed period.

In the present invention, the length of the divided seismic waveform may be set to 5 to 10 times the length of the analyzed period.

In the present invention, in step S500, the phase shift may be calculated by Equation 1. In the present invention, in step S600, the waveform in the orientation rotated clockwise from N' by α may be calculated by Equation 2.

In the present invention, in step S700, the correlation coefficient may be calculated by Equation 3.

In the present invention, in step S800, C(α) for each time domain is calculated as a result value, an average value obtained by averaging the derived result values is calculated, and a when the average C(α) becomes the maximum may be judged as the polarization direction of the Rayleigh wave.

In the present invention, in step S900, if the orientation of the borehole seismometer sensor rotates by θ in an arbitrary orientation compared to the reference seismometer, the Rayleigh wave propagation orientation determined by the two seismometers has a difference of θ, and if the orientation of the Rayleigh wave of the borehole seismometer is φ and the orientation of the Rayleigh wave of the reference seismometer is φ, then θ may be calculated by Equation 4.

The present invention may be combined with hardware and be implemented as a computer program stored in a computer readable recording medium in order to execute the method to determine the azimuthal orientation of a borehole seismometer sensor using long-period surface waves in microseisms according to the present invention by a computer.

The present invention is a system to determine an azimuthal orientation of a borehole seismometer sensor performed by a computing device using a control server having a database and an arithmetic function, the system comprising: a data collection unit for collecting continuous waveform data recorded by a borehole seismometer and a reference seismometer; a frequency band setting unit for setting a frequency band to be analyzed in the collected continuous waveform data; a filtering unit for performing bandpass filtering on the frequency band to be analyzed; a waveform dividing unit for dividing seismic waveform into preset time units; a phase shift unit for shifting the phase of the divided vertical component waveforms by 90°; a waveform calculation unit for combining the divided N' and E' component seismic waveforms to calculate a horizontal component waveform between 0 and 360° at each time based on the N' orientation; a correlation calculation unit for calculating a correlation coefficient between the horizontal and vertical component waveforms; a Rayleigh wave orientation determination unit for repeating steps S500 to S700 for each divided time domain; an orientation comparison unit for performing steps S400 to S800, respectively, with respect to the borehole seismometer data for which the sensor orientation is to be determined and the reference seismometer data for which the sensor orientation is already known; and a result calculation unit for averaging θ determined for each time period to calculate a final result.

The method and system to determine the azimuthal orientation of a borehole seismometer sensor using long-period surface waves in microseisms according to the present invention have the following effects.

First, by using long-period surface waves in microseisms, the orientation of the borehole seismometer sensor can be estimated without the occurrence of earthquakes as a condition.

First, by using long-period surface waves in microseisms, the orientation of the borehole seismometer sensor can be estimated without installing an additional seismometer.

The effects of the present invention are not limited to those mentioned above, and other effects not mentioned will be clearly understood by those of ordinary skill in the art from the following description.

BRIEF DESCRIPTION OF THE DRAWINGS

The above and other aspects, features, and advantages of the present invention will become more apparent to those of ordinary skill in the art by describing embodiments thereof in detail with reference to the accompanying drawings, in which.

DETAILED DESCRIPTION OF THE EMBODIMENTS

Hereinafter, exemplary embodiments of the present invention will be described so that those of ordinary skill in the art can readily implement the present invention with reference to the accompanying drawings. As can be easily understood by those of ordinary skill in the art, the embodiments described below may be modified in various forms without departing from the concept and scope of the present invention. Wherever possible, identical or similar parts are denoted by the same reference numerals in the drawings.

The terminology used herein is for the purpose of referring to specific embodiments only, and is not intended to limit the present invention. As used herein, the singular forms also include the plural forms unless the phrases clearly indicate the opposite.

The meaning of "comprising," as used herein, specifies a particular characteristic, region, integer, step, operation, element and/or component, and does not exclude the presence or addition of other specific characteristic, region, integer, step, operation, element, component, and/or group.

All terms including technical and scientific terms used in this specification have the same meaning as commonly understood by those of ordinary skill in the art. Terms defined in the dictionary are further interpreted as having a meaning consistent with the related art literature and the presently disclosed content, and unless defined, are not interpreted in an ideal or very formal meaning.

Directional expressions used in this specification, for example, front/back/left/right expressions, up/down expressions, longitudinal/transverse direction expressions may be interpreted with reference to the directions disclosed in the drawings.

Hereinafter, the technical terms used in the present specification will be summarized.

First, a seismometer means a machine for recording the movement of the ground. A three-component (e.g., east-west, north-south, up-down) sensor is required to fully record spatial motion.

Next, a surface seismometer means a seismometer installed on the surface of the earth. It can be installed correctly by measuring the orientation of the seismometer sensor precisely.

Next, a borehole seismometer means a seismometer installed deep underground (tens to hundreds of m below the ground surface). Due to the nature of the installation process, it is difficult to correctly set the horizontal orientation.

Next, ambient seismic noise means an ever-present level of shaking of the ground caused by various natural/anthropogenic phenomena and activities (e.g., waves, wind, meteorological activity, automobiles, airplanes, human footsteps, etc.) other than earthquakes (or including minor earthquakes that cannot be specified).

Next, microseisms refer to energies that appear distinctly below 1 Hz in seismic noise. It is known to be mainly caused by marine activities. It is largely divided into primary microseisms appearing between 0.05-0.1 Hz and secondary microseisms appearing between 0.1-0.5 Hz.

Next, a Rayleigh wave means a seismic wave that propagates horizontally along the surface of the earth. It proceeds with retrograde elliptical motion. It is known as the main energy that makes up microseisms.

Hereinafter, a conventional method to determine the orientation of a borehole seismometer sensor will be described.

Figure 3:
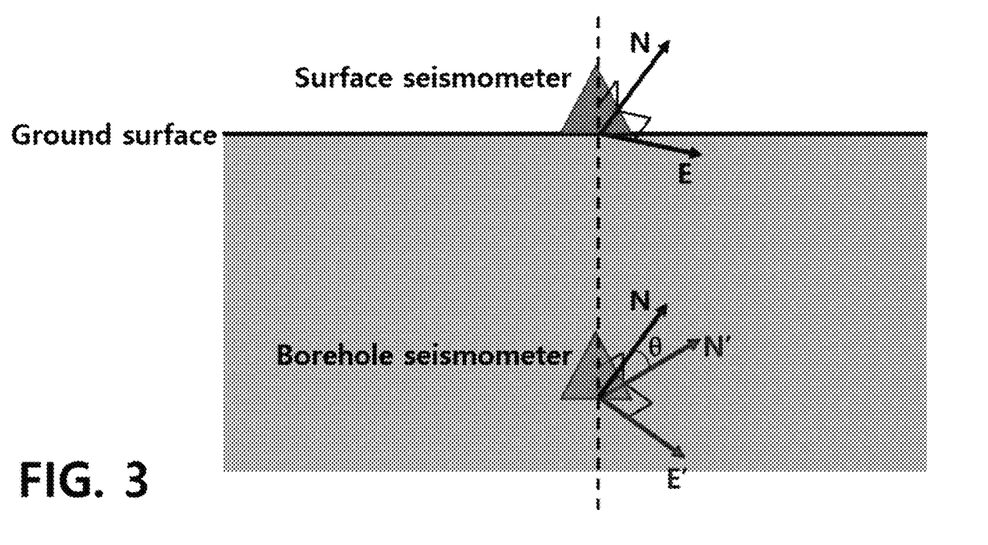
FIG. 3 is a mimetic diagram of the installation of a borehole seismometer.

FIG. 3 is a mimetic diagram of the installation of a borehole seismometer. It shows the installation form of the borehole seismometer and the method to determine the orientation of the borehole seismometer sensor, which is a problem to be solved through the present invention.

Figure 4:
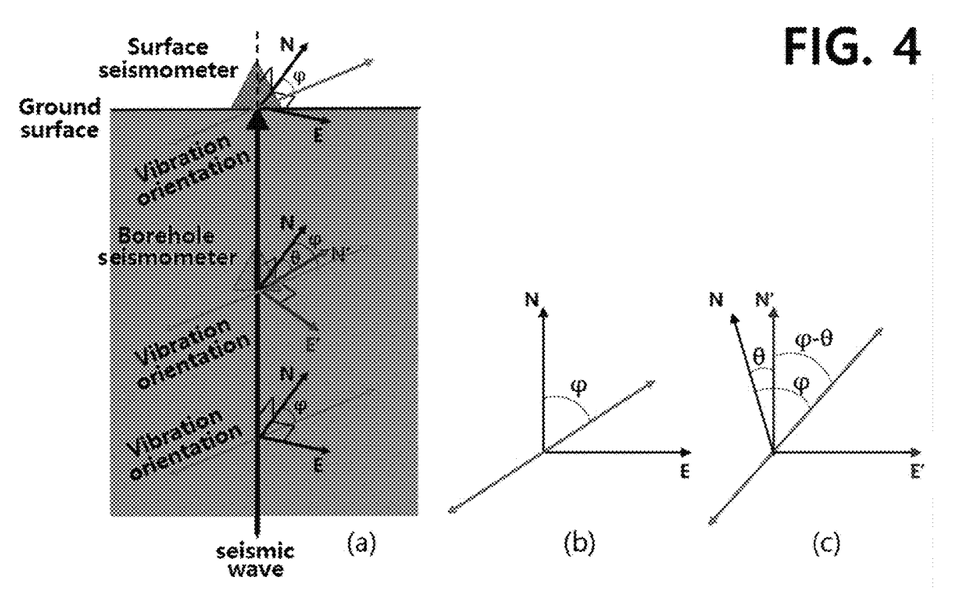
FIG. 4 is a mimetic diagram of seismic wave recording of a borehole seismometer.

FIG. 4 is a mimetic diagram of seismic wave recording of a borehole seismometer. It shows the form in which seismic wave polarization direction is recorded in the borehole seismometer and how to determine the orientation of the borehole seismometer sensor. FIG. 4a shows a mimetic diagram of the type of seismic waves incident on the installed seismometer and the orientation of its polarization, and the graphs of FIGS. 4b and 4c show mimetic diagrams of polarization directions of seismic waves recorded by the surface seismometer and the borehole seismometer.

In the related art, the orientation of the borehole seismometer sensor is determined by comparing the polarization directions of the seismic waves recorded by the surface seismometer and the borehole seismometer placed at the same location. A mimetic diagram of the orientation in which the sensor is placed when the horizontal orientation sensor of the borehole seismometer is rotated by θ is shown in FIG. 3. Here, N and E are the correct north and east directions, and N' and E' are the orientations of the borehole sensor rotated by θ.

If a seismic wave polarized in the orientation φ from the north-south orientation is recorded by the surface and borehole seismometers, the polarization directions of φ will appear in the surface record, but since the borehole seismometer sensor is azimuthally deviated by θ, the apparent polarization direction of φ-θ will be recorded in the borehole record. Therefore, the value of θ can be obtained by comparing the records of the surface seismometer and the borehole seismometer.

A major problem of such related art is that it utilizes seismic waves generated from earthquakes. This analysis requires seismic waves with clear polarization directions to be recorded simultaneously at both surface and borehole seismometers. If the seismic waves are not strong enough, the ambient seismic noise can cause errors in the analysis. In addition, there is a problem of waiting for a sufficiently large earthquake to be used for analysis, and additional seismometers need to be installed on the ground surface.

It is impossible to estimate the orientation of the seismometer before the occurrence of an earthquake, and there are many restrictions on the use of this method in environments where large earthquakes do not occur frequently, such as in the Korean Peninsula. As a complementary method, seismic waves can be generated through artificial blasting, but as described above, large blasting is required to record a sufficiently strong seismic wave, so it is difficult to use in large urban areas. In particular, since additional seismometers are required on the ground surface of the borehole, additional costs are inevitable.

Hereinafter, the present invention will be described with reference to the drawings. For reference, the drawings may be partially exaggerated in order to explain the features of the present invention. In this case, it is preferable to be interpreted in light of the whole meaning of this specification.

In the present invention, the polarization direction of a Rayleigh wave component included in microseism energy of 0.05-0.5 Hz among the ambient seismic noise is analyzed. The orientation of the borehole seismometer sensor is determined by comparing the polarization directions of Rayleigh waves determined by the borehole seismometer and an arbitrary seismometer installed in or near the area (a seismometer whose sensor orientation is already known).

Figure 1:
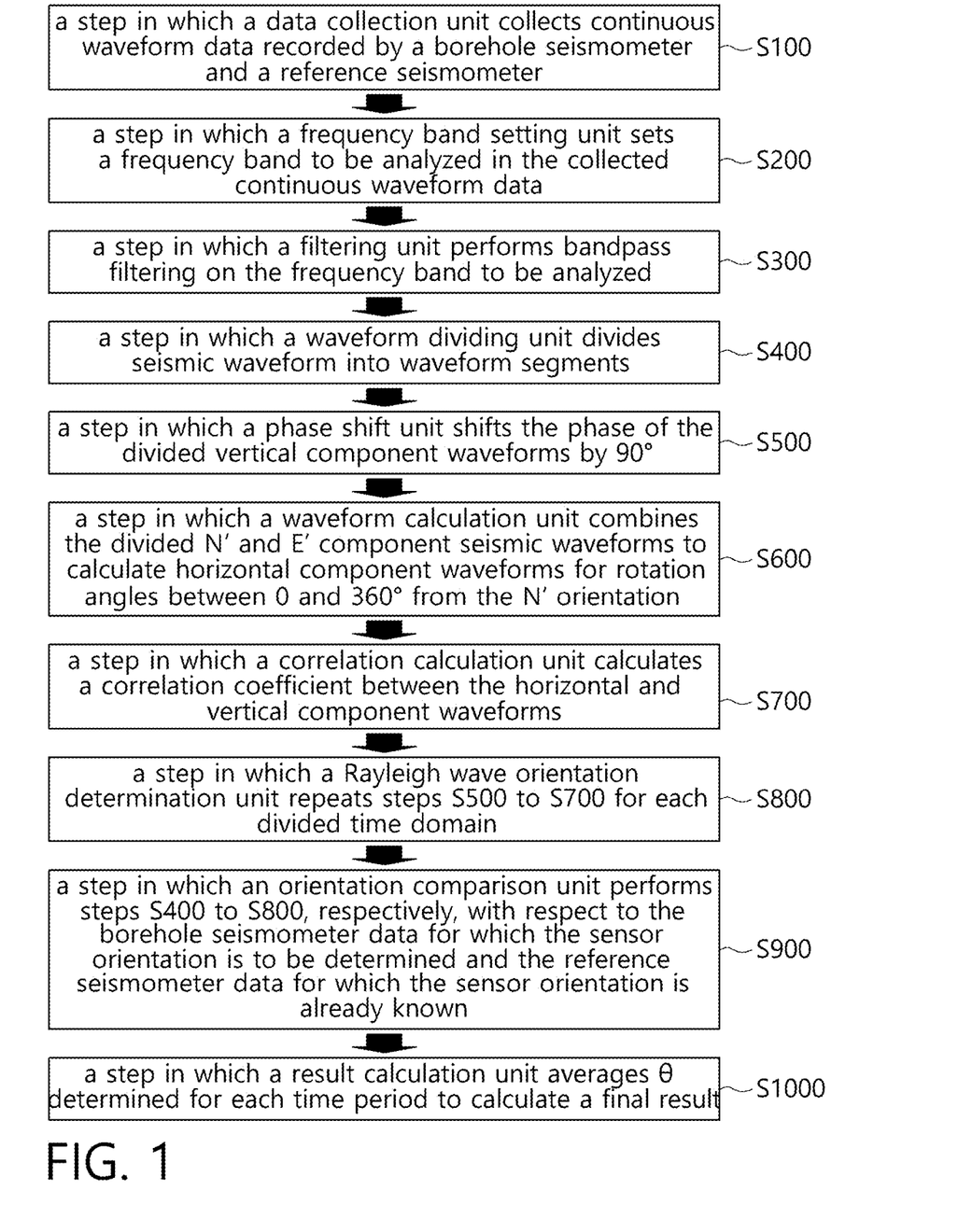
FIG. 1 is a flowchart of a method to determine the azimuthal orientation of a borehole seismometer sensor using long-period surface waves in microseisms.

FIG. 1 is a flowchart of a method to determine the azimuthal orientation of a borehole seismometer sensor using long-period surface waves in microseisms according to the present invention.

As shown in FIG. 1, the present invention is a method to determine the azimuthal orientation of a borehole seismometer sensor performed by a computing device using a control server having a database and an arithmetic function, the computing device performing a method to determine the azimuthal orientation of a borehole seismometer sensor using long-period surface waves in microseisms, including step S100 in which a data collection unit 100 collects continuous waveform data recorded by a borehole seismometer and a reference seismometer; step S200 in which a frequency band setting unit 200 sets a frequency band to be analyzed in the collected continuous waveform data; step S300 in which a filtering unit 300 performs bandpass filtering on the frequency band to be analyzed; step S400 in which a waveform dividing unit 400 divides seismic waveform into waveform segments; step S500 in which a phase shift unit 500 shifts the phase of the divided vertical component waveforms by 90°; step S600 in which a waveform calculation unit 600 combines the divided N' and E' component seismic waveforms to calculate horizontal component waveforms for rotation angles between 0 and 360° from the N' orientation; step S700 in which a correlation calculation unit 700 calculates a correlation coefficient between the horizontal and vertical component waveforms; step S800 in which a Rayleigh wave orientation determination unit 800 repeats steps S500 to S700 for each divided time domain; step S900 in which an orientation comparison unit 900 performs steps S400 to S800, respectively, with respect to the borehole seismometer data for which the sensor orientation is to be determined and the reference seismometer data for which the sensor orientation is already known; and step S1000 in which a result calculation unit 1000 averages θ determined for each time period to calculate a final result.

Step S100 according to the present invention is a step in which the data collection unit 100 collects continuous waveform data recorded by a borehole seismometer and a reference seismometer.

In step S100, the continuous waveform data is preferably three-component continuous waveform data.

In step S100, data necessary for analysis are collected. For stable analysis, three-component continuous waveform data for several hours or days are required. Continuous waveform data recorded by borehole seismometers and surrounding existing seismometers (e.g., seismic observatories under the Korea Meteorological Administration) are collected.

Figure 5:
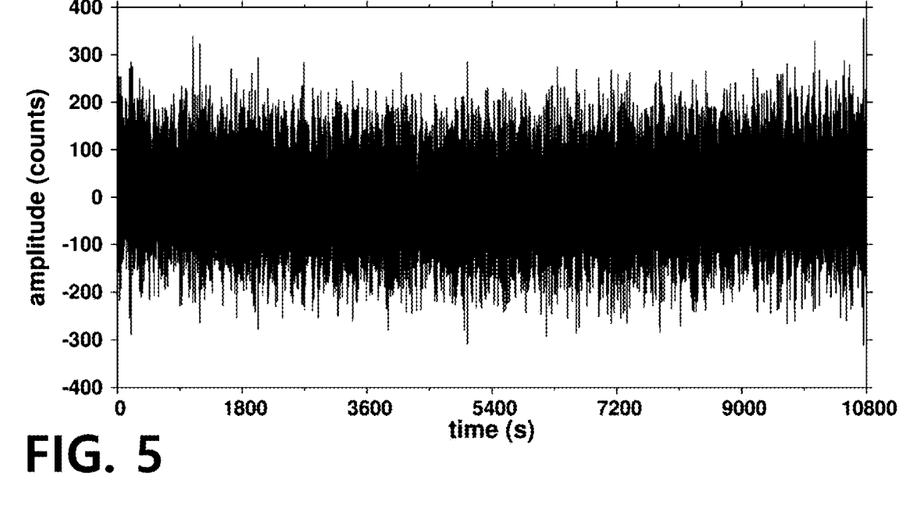
FIG. 5 is a seismogram, and shows an embodiment of seismic waveforms required for analysis.

FIG. 5 is a seismogram, and shows an embodiment of seismic waveforms required for analysis. FIG. 5 is an example of the analysis data, and shows the vertical component continuous waveform data recorded by the borehole seismometer of Yonsei University between 00:00 and 03:00 o'clock on Oct. 9, 2021.

Step S200 according to the present invention is a step in which the frequency band setting unit 200 sets a frequency band to be analyzed in the collected continuous waveform data.

In step S200, the frequency band to be analyzed preferably includes a frequency band having a lot of microseism energy.

In step S200, a frequency band to be analyzed is set. Microseisms occur mainly between 0.05 and 0.5 Hz. It is advantageous in terms of stability of analysis to analyze around the frequency showing the highest energy in this frequency band (peak frequency).

Figure 6:
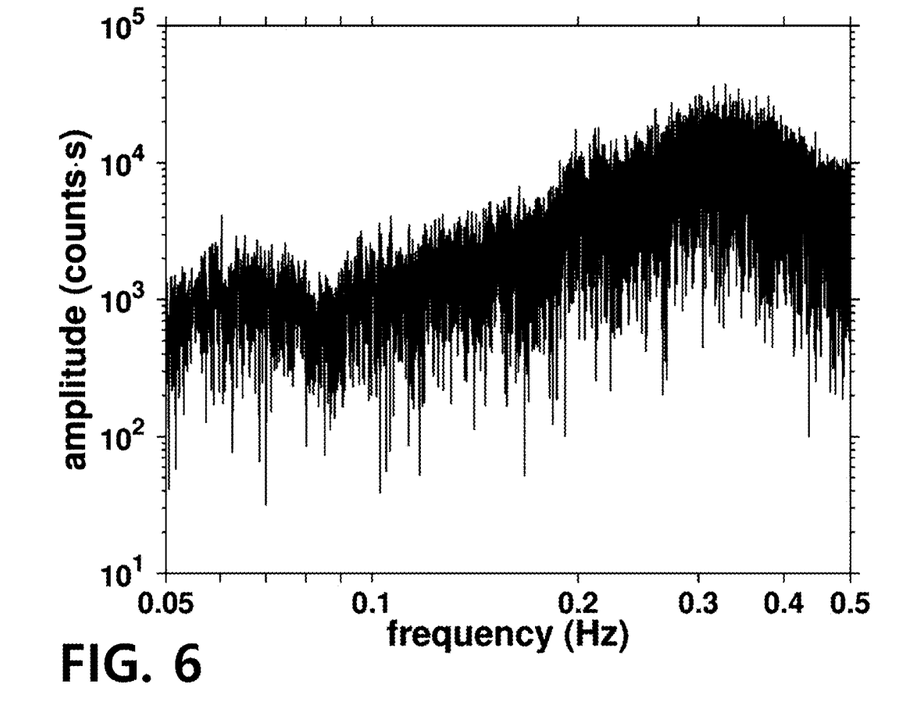
FIG. 6 shows an embodiment of the seismic wave frequency component confirmation.

FIG. 6 shows an embodiment of the seismic wave frequency component confirmation. FIG. 6 shows the frequency component of the waveform shown in FIG. 3, and it can be seen in FIG. 6 that a lot of microseism energy appears at 0.2-0.4 Hz, which shows that it is desirable to analyze the frequency band around this.

Step S300 according to the present invention is a step in which the filtering unit 300 performs bandpass filtering on the frequency band to be analyzed.

In step S300, the filter used for bandpass filtering includes a Butterworth filter and a Gaussian filter.

In step S300, bandpass filtering is performed on the frequency band to be analyzed for all seismic waveforms. The type of filter used (Butterworth filter, Gaussian filter, etc.) can be freely set.

Figure 7:
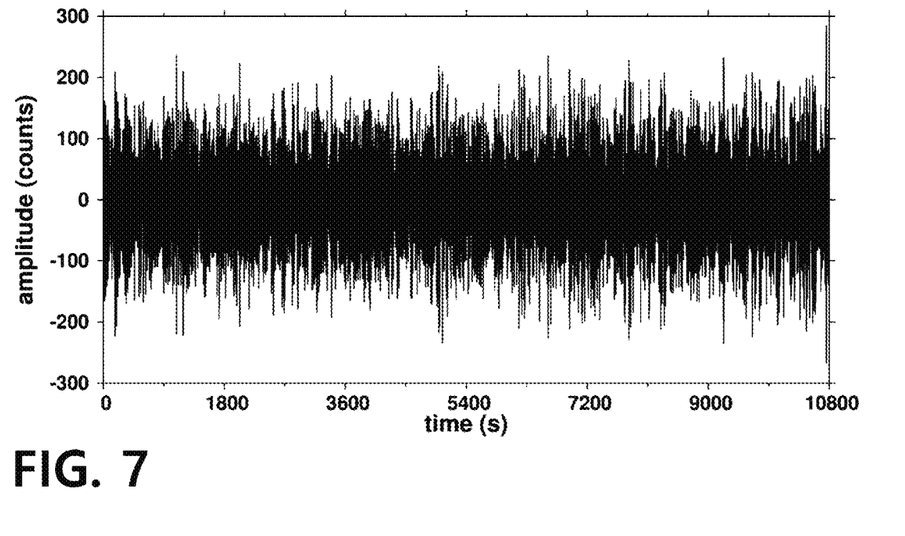
FIG. 7 is an embodiment of bandpass filtered seismic waveforms, and shows the result of bandpass filtering the waveforms of FIG. 5 at 0.2-0.4 Hz.

FIG. 7 is an embodiment of bandpass filtered seismic waveforms, and shows the result of bandpass filtering the waveforms of FIG. 5 at 0.2-0.4 Hz.

Step S400 according to the present invention is a step in which the waveform dividing unit 400 divides the seismic waveform into preset time units.

In step S400, the length of the divided seismic waveform may be set according to the analyzed period (reciprocal of frequency). The length of the divided seismic waveform may be set to 5 to 10 times the length of the analyzed period.

In step S400, the seismic waveform is divided into short waveform segments. In subsequent steps S500 to S700, the divided waveform data are independently analyzed. In this case, the length of the divided seismic waveform is set in consideration of the period used for analysis.

In the present invention, it is possible to derive stable results by dividing the seismic waveform into a length of 5 to 10 times the period to be analyzed.

Figure 8:
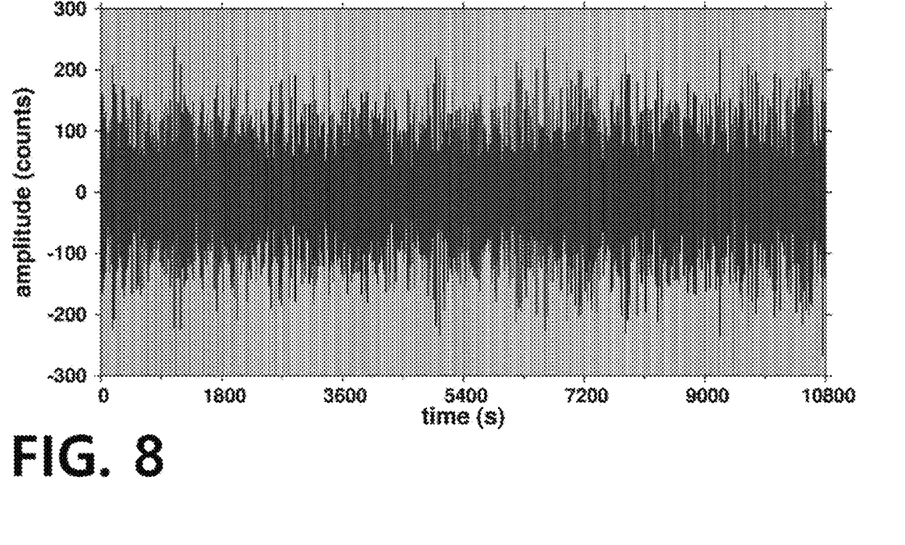
FIG. 8 is an embodiment of seismic waveform division, and shows the seismic waveforms of FIG. 7 divided into 30 second intervals (intervals separated by red lines)
Figure 9:
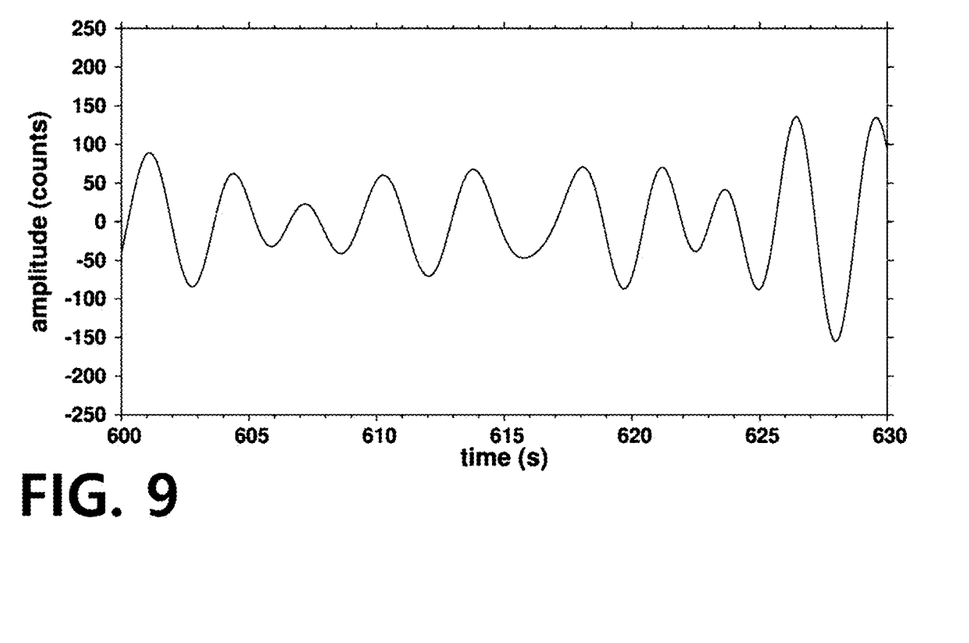
FIG. 9 is an embodiment of seismic waveforms divided into short time domains, and shows one of the seismic waveforms divided as a result of FIG. 8.

FIG. 8 is an embodiment of seismic waveform division, and shows the seismic waveforms of FIG. 7 divided into 30 second intervals (intervals separated by red lines). FIG. 9 is an embodiment of seismic waveforms divided into short time domains, and shows one of the seismic waveforms divided as a result of FIG. 8.

Subsequent steps S500 to S700 represent analysis of each divided time.

For reference, in the case of step S400, the frequency used is 0.2-0.4 Hz, the corresponding period is 2.5-5 seconds, and the median value of the period is about 3.3 seconds. The seismic waveform was divided into 30 second intervals, about 9 times the median value.

Step S500 according to the present invention is a step in which the phase shift unit 500 shifts the phase of the divided vertical component waveforms by 90°.

In step S500, the phase shift may be calculated by Equation 1 below.

$$Z'(t) = \int U_Z(f) \exp[i(2\pi ft + \text{sign}(f)\pi/2)] df \quad \text{[Equation 1]}$$

Here, t is time, f is frequency, Z'(t) is a 90° phase-shifted vertical component waveform, and $U_Z(f)$ is a Fourier transform equation of the vertical component waveform.

Figure 10:
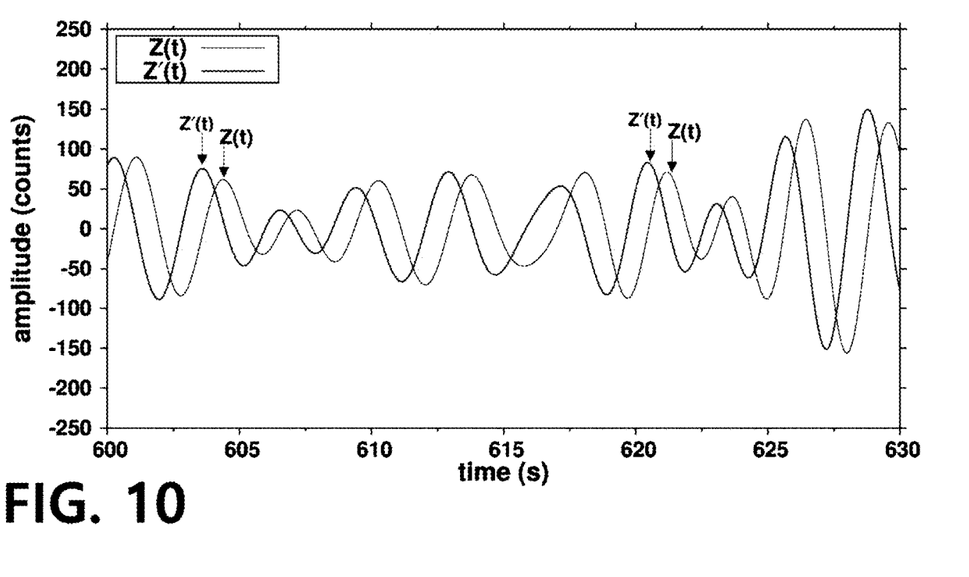
FIG. 10 is an embodiment of 90° phase shift of a vertical component waveform, and shows what results are obtained through this analysis by comparing before the phase shift by a black line and after the phase shift by a red line.

The result of 90° phase shift of the vertical component seismic waveform shown in FIG. 9 is shown in FIG. 10.

FIG. 10 is an embodiment of 90° phase shift of a vertical component waveform, and shows what results are obtained through this analysis by comparing before the phase shift by a black line and after the phase shift by a red line.

Step S600 according to the present invention is a step in which the waveform calculation unit 600 combines the divided N' and E' component seismic waveforms to calculate horizontal component waveforms for rotation angles between 0 and 360° from the N' orientation.

In step S600, the waveform in the orientation rotated clockwise from N' by a may be calculated by the following Equation 2.

$$R_\alpha(t) = N'(t)\cos(\alpha) + E'(t)\sin(\alpha) \quad \text{[Equation 2]}$$

Here, t is time, $R_\alpha(t)$ is the seismic waveform in the horizontal orientation with an angle of α clockwise from N', and N'(t) and E'(t) are seismic waveforms in the N' and E' orientations.

Figure 11:
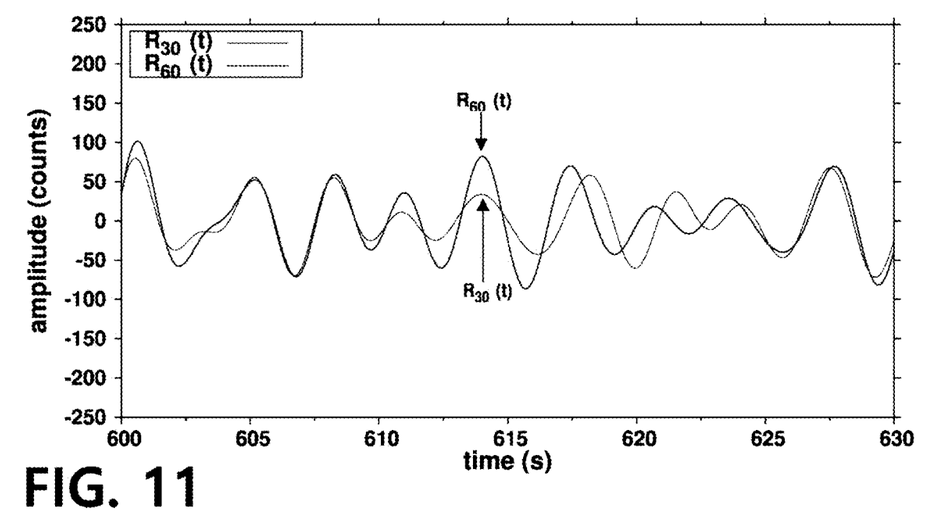
FIG. 11 is an embodiment of calculating a horizontal component waveform for an arbitrary orientation in the range of 0-360°, and shows examples for 30° and 60° orientations with red and blue lines, respectively.

$R_\alpha(t)$ for a between 0 and 360° with close interval of 1° or less is calculated. FIG. 11 is an example of the analysis, and shows the results of analyzing the horizontal component seismic waveforms of Yonsei University borehole seismometer records for α=30° and 60°.

FIG. 11 is an embodiment of calculating a horizontal component waveform for an arbitrary orientation in the range of 0-360°, and shows examples for 30° and 60° orientations with red and blue lines, respectively.

Step S700 according to the present invention is a step in which the correlation calculation unit 700 calculates a correlation coefficient between the horizontal and vertical component waveforms.

The correlation coefficient is a value indicating how similar two functions are to each other, and when the two are exactly the same, it returns 1, when the two are completely opposite, it returns −1, and the closer the value is to 1, the more similar they are.

In step S700, the correlation coefficient may be calculated by the following Equation 3.

$$C(\alpha) = \frac{\int Z'(t) R_\alpha(t) dt}{\sqrt{\int [Z'(t)]^2 dt} \sqrt{\int [R_\alpha(t)]^2 dt}} \quad \text{[Equation 3]}$$

Here, C(α) is a correlation coefficient between the horizontal component Rα(t) and the 90° phase-shifted vertical component seismic waveform Z'(t).

Figure 12:
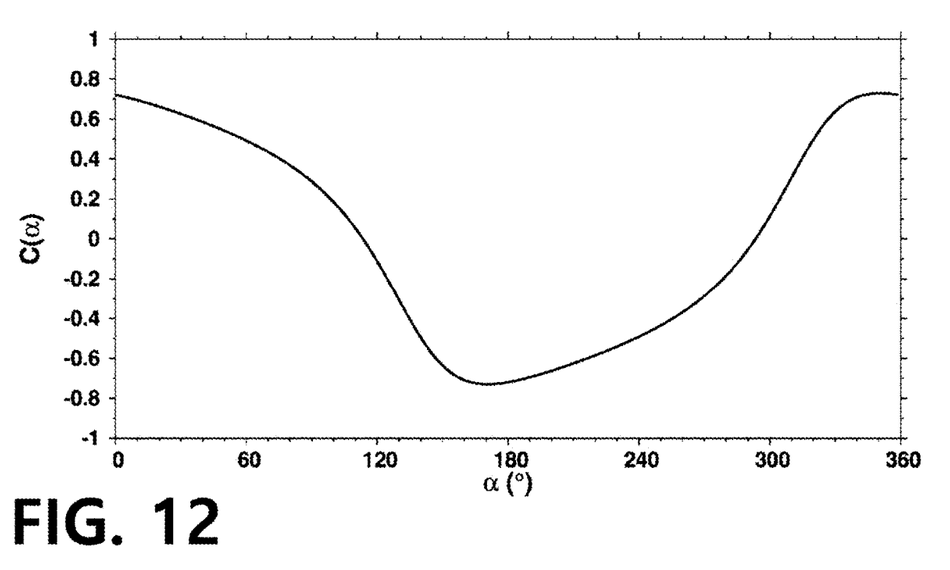
FIG. 12 is a vertical-horizontal component correlation coefficient function according to an orientation, and shows a correlation coefficient between the horizontal component waveform in the α orientation and the 90° phase-shifted vertical component waveform as a function C(α) with respect to the horizontal orientation α.

FIG. 12 is a vertical-horizontal component correlation coefficient function according to an orientation, and shows a correlation coefficient between the horizontal component waveform in the α orientation and the 90° phase-shifted vertical component waveform as a function C(α) with respect to the horizontal orientation α.

Since a is given as continuous values from 0 to 360°, C(α) is expressed as a function of orientation α. FIG. 12 is an example thereof, and shows a correlation coefficient between the vertical component waveform shown in FIG. 10 and the horizontal component shown in FIG. 11 with respect to α.

Hereinafter, steps S500 to S700 will be further described.

It is known that microseism energy includes a Rayleigh wave component. The particle motion of a Rayleigh wave is a retrograde elliptical motion, and in this motion, the phase of the horizontal component waveform and the vertical component waveform shows a difference of 90°. Therefore, if a vertical component waveform of a Rayleigh wave is phase-shifted by 90°, the horizontal component and vertical component waveforms should be the same.

Therefore, after calculating seismic waveforms for various horizontal orientations, comparing them with the 90° phase-shifted vertical waveforms to find a horizontal orientation with a high correlation coefficient, this orientation can be said to be the polarization and propagation direction of the Rayleigh wave.

Steps S500 to S700 are a process for determining the propagation direction of microseisms recorded in one seismometer in this way.

Step S800 according to the present invention is a step in which the Rayleigh wave orientation determination unit 800 repeats steps S500 to S700 for each divided time domain.

In step S800, C(α) for each time domain is calculated as a result value, an average value obtained by averaging the derived result values is calculated, and α when the average C(α) becomes the maximum may be judged as the polarization direction of the Rayleigh wave.

In step S800, steps S500 to S700 are all repeated for each divided time domain. In the example of step S400, since the 3-hour waveform is divided into units of 30 seconds, 360 results (C(α)) are obtained through steps S500 to S700. All results may be averaged to produce a more stable final result.

That is, since analysis for a short time domain (e.g., 30 second units in the example) may have low stability, step S800 is a process of increasing stability by obtaining the average of a sufficiently large number of data.

Figure 13:
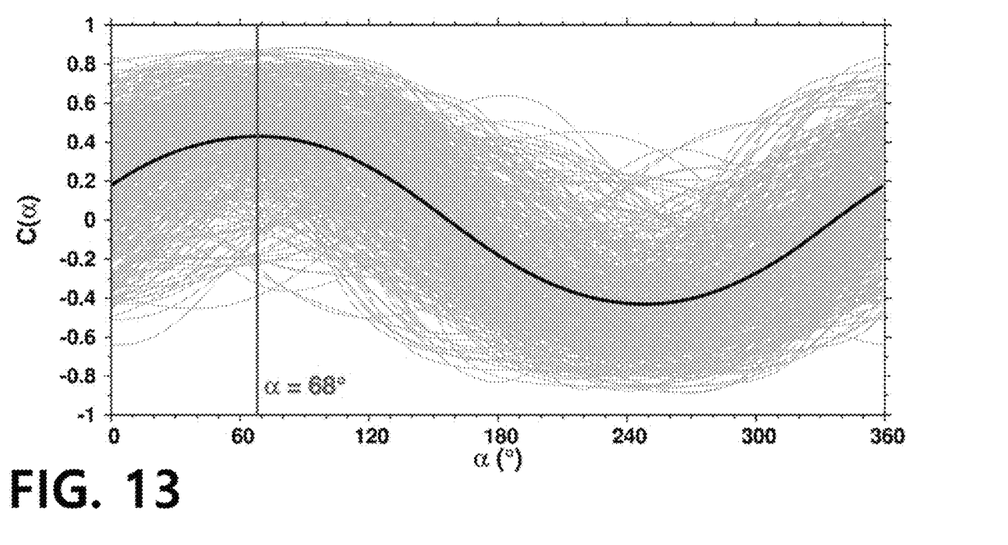
FIG. 13 is an embodiment of determining the Rayleigh wave orientation, and shows that the Rayleigh wave orientation is stably determined by accumulating and averaging C(α)s calculated in a divided time domain.

FIG. 13 is an embodiment of determining the Rayleigh wave orientation, and shows that the Rayleigh wave orientation is stably determined by accumulating and averaging C(α)s calculated in a divided time domain.

FIG. 13 is an example of this, and shows each result obtained for the 360 time domains divided in FIG. 6 and a result of averaging them. In this case, it can be estimated that α when the average C(α) becomes the maximum indicates the polarization direction of the Rayleigh wave.

Step S900 according to the present invention is a step in which the orientation comparison unit 900 performs steps S400 to S800, respectively, with respect to the borehole seismometer data for which the sensor orientation is to be determined and the reference seismometer data for which the sensor orientation is already known.

In step S900, the Rayleigh wave polarization directions of the reference and borehole seismometers are compared.

Steps S400 to S800 are respectively performed with respect to the borehole seismometer data for which the sensor orientation is to be determined and the surrounding reference seismometer data for which the sensor orientation is already known.

In step S900, if the orientation of the borehole seismometer sensor is azimuthally deviated by θ in an arbitrary orientation compared to the reference seismometer, the Rayleigh wave propagation orientation determined by the two seismometers has a difference of θ, and if the orientation of the Rayleigh wave of the borehole seismometer is φ' and the orientation of the Rayleigh wave of the reference seismometer is φ, then θ may be calculated by Equation 4 below.

$$\theta=\varphi-\varphi' \quad \text{[Equation 4]}$$

Figure 14:
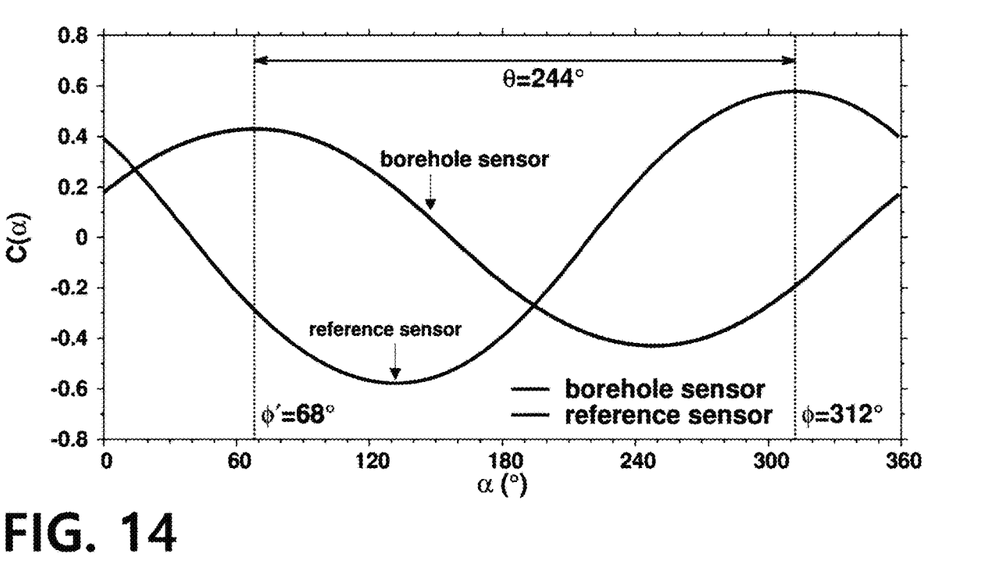
FIG. 14 is an embodiment of determining the orientation of a borehole seismometer, and shows the determination of the orientation of a borehole seismometer sensor by comparing the Rayleigh wave orientations calculated in the borehole seismometer and the reference seismometer.

FIG. 14 is an example of this, and is a result of determining θ through Rayleigh wave orientation analysis for 3-hour data of a borehole seismometer of Yonsei University and a surface reference seismometer installed at the same location.

FIG. 14 is an embodiment of determining the orientation of a borehole seismometer, and shows the determination of the orientation of a borehole seismometer sensor by comparing the Rayleigh wave orientations calculated in the borehole seismometer and the reference seismometer. C(α) calculated from the borehole seismometer and the reference seismometer is shown with red and blue lines, respectively, and the meaning of θ and the process of finding it can be intuitively understood by indicating φ, φ', which are α values when each C(α) becomes the maximum, and θ obtained through them.

Step S1000 according to the present invention is a step in which the result calculation unit 1000 averages θ determined for each time period to calculate a final result.

In step S1000, the final result is calculated, and in steps S100 to S900, a waveform analysis process of a total length of 3 hours is shown. This process is repeated for a longer period of time (e.g., 2 days) and the θ determined for each time period is averaged to calculate the final result.

Figure 15:
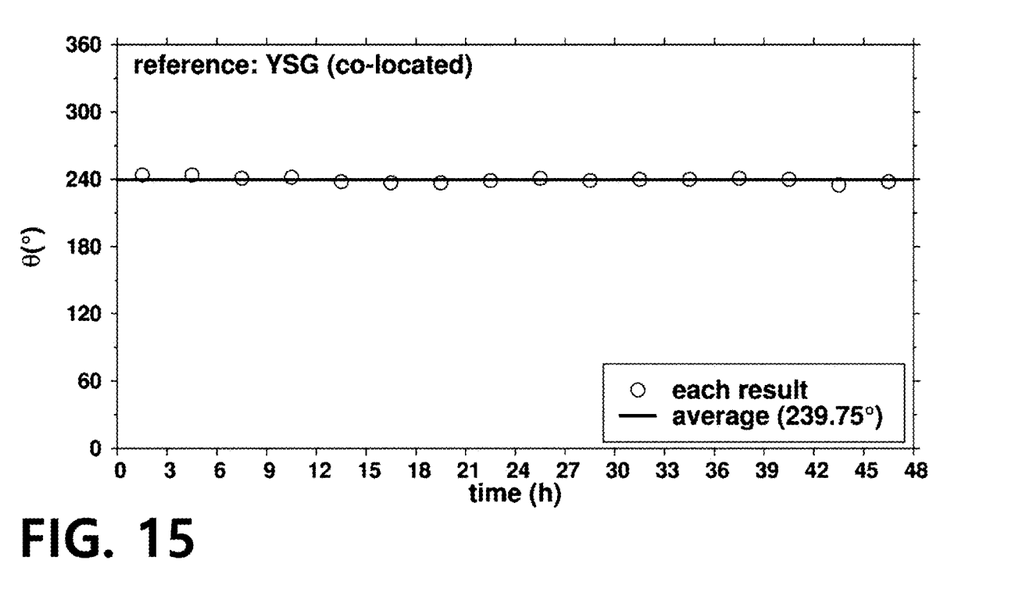
FIG. 15 is an embodiment of final result calculation (reference seismometer: YSG), and circles in the figure indicate θ measured at 3-hour intervals for 2 days, and their average values are indicated by a solid line. It is a figure showing the process of calculating the final result by averaging the results measured at 3-hour intervals.
Figure 16:
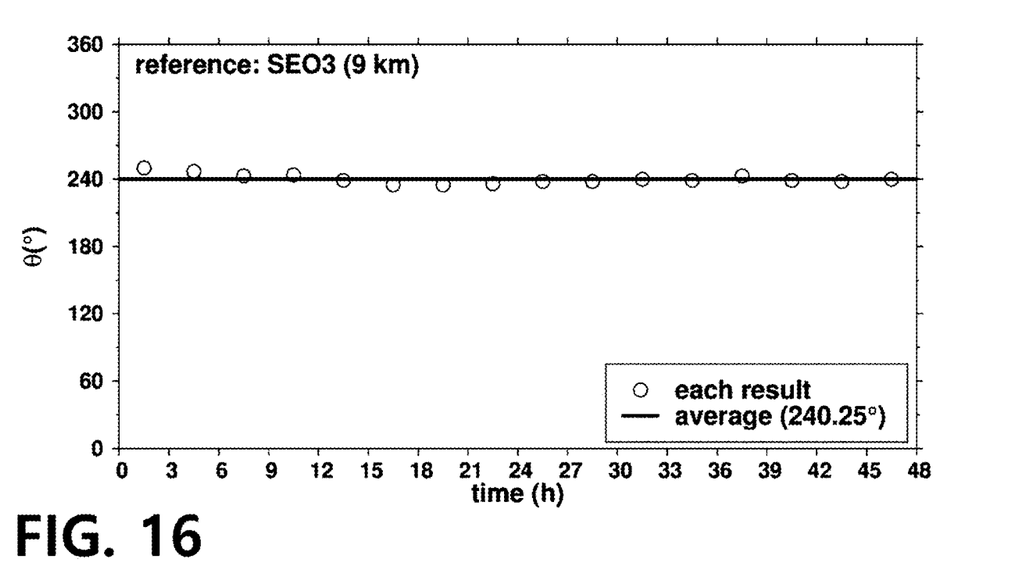
FIG. 16 is an embodiment of final result calculation (reference seismometer: SEO3), and is the same as FIG. 15, but shows the results of using a seismometer (SEO3) 9 km away from the borehole as a reference seismometer.

FIGS. 15 and 16 are examples of this, and use the Yonsei University surface seismometer (YSG, FIG. 13) and the Seoul Observatory under the Korea Meteorological Administration (SEO3, FIG. 14) as reference seismometers to determine the orientation of the Yonsei University borehole seismometer every 3 hours, and the average value thereof is derived as the final result.

FIG. 15 is an embodiment of final result calculation (reference seismometer: YSG), and circles in the figure indicate θ measured at 3-hour intervals for 2 days, and their average values are indicated by a solid line. It is a figure showing the process of calculating the final result by averaging the results measured at 3-hour intervals.

FIG. 16 is an embodiment of final result calculation (reference seismometer: SEO3), and is the same as FIG. 15, but shows the results of using a seismometer (SEO3) 9 km away from the borehole as a reference seismometer.

The Korea Meteorological Administration SEO3 seismometer is about 9 km away from the Yonsei University borehole seismometer, and the θ determined by using the YSG seismometer and the Korea Meteorological Administration SEO3 seismometer as references is 239.75° and 240.25°, respectively, which are almost similar.

This shows that the orientation of the borehole seismometer can be determined by using the existing surrounding seismometer data without the need to install a surface reference seismometer at the same location as the borehole seismometer. In addition, these results show that the borehole seismometer sensor orientation can be precisely determined by using only the microseism energy of ambient seismic noise without using seismic data.

Meanwhile, the present invention can be implemented as a determination system invention. Particularly, the present invention can be implemented as a system to determine the azimuthal orientation of a borehole seismometer sensor using long-period surface waves in microseisms.

This determination system invention is substantially the same as the determination method invention described above, and the categories of the invention are different. Accordingly, the configuration common to the determination method invention will be replaced with the description of the determination method invention described above, and Hereinafter, the gist of the determination system invention will be mainly described.

Figure 2:
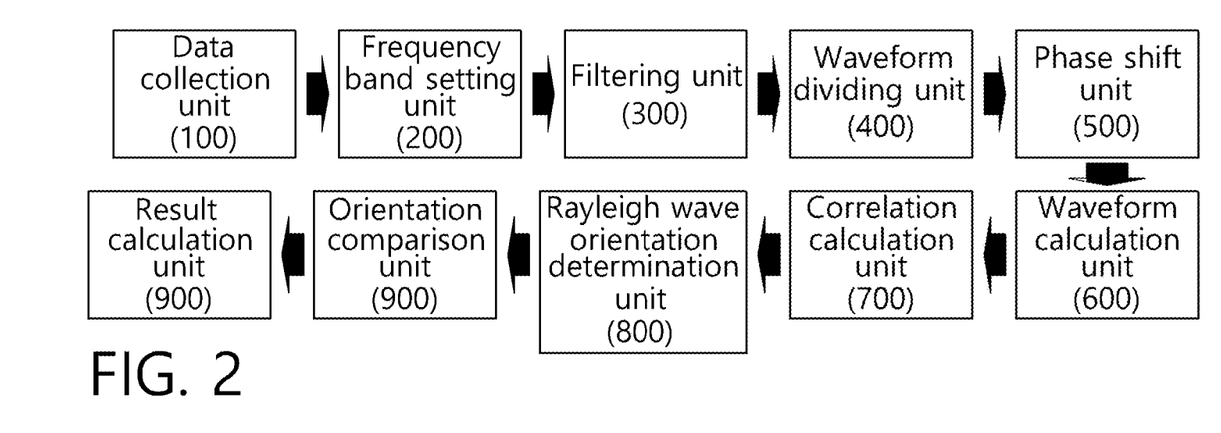
FIG. 2 is a block diagram of a system to determine the azimuthal orientation of a borehole seismometer sensor using long-period surface waves in microseisms according to the present invention.

FIG. 2 is a block diagram of a system to determine the azimuthal orientation of a borehole seismometer sensor using long-period surface waves in microseisms according to the present invention.

As shown in FIG. 2, the present invention is a system to determine the azimuthal orientation of a borehole seismometer sensor performed by a computing device using a control server having a database and an arithmetic function, the system comprising: a data collection unit 100 for collecting continuous waveform data recorded by a borehole seismometer and a reference seismometer; a frequency band setting unit 200 for setting a frequency band to be analyzed in the collected continuous waveform data; a filtering unit 300 for performing bandpass filtering on the frequency band to be analyzed; a waveform dividing unit 400 for dividing seismic waveform into waveform segments with preset time units; a phase shift unit 500 for shifting the phase of the divided vertical component waveforms by 90°; a waveform calculation unit 600 for combining the divided N' and E' component seismic waveforms to calculate horizontal component waveforms for rotation angles between 0 and 360° from the N' orientation; a correlation calculation unit 700 for calculating a correlation coefficient between the horizontal and vertical component waveforms; a Rayleigh wave orientation determination unit 800 for repeating steps S500 to S700 for each divided time domain; an orientation comparison unit 900 for performing steps S400 to S800, respectively, with respect to the borehole seismometer data for which the sensor orientation is to be determined and the reference seismometer data for which the sensor orientation is already known; and a result calculation unit 1000 for averaging θ determined for each time period to calculate a final result.

In addition, the present invention may be implemented as a computer program. Specifically, the present invention may be combined with hardware and be implemented as a computer program stored in a computer readable recording medium in order to execute the method to determine the azimuthal orientation of a borehole seismometer sensor using long-period surface waves in microseisms according to the present invention by a computer.

The methods according to an embodiment of the present invention may be implemented in the form of a program readable by various computer means and recorded in a computer readable recording medium. Here, the recording medium may include a program command, a data file, a data structure, etc. alone or in combination. The program instructions recorded on the recording medium are specially designed and configured for the present invention, and also may be known and used by those skilled in the computer software field. For example, the recording medium includes hardware devices specifically configured to store and execute program instructions including a hard disk, a magnetic medium such as a floppy disk and a magnetic tape, an optical recording medium such as CD-ROM and DVD, a magneto-optical media such as a floptical disk, and ROM, RAM, flash memory, and the like. Examples of program instructions include not only machine languages such as those generated by a compiler, but also high-level languages that can be executed by a computer using an interpreter or the like. Such hardware devices may be configured to operate as one or more software modules to perform the operations of the present invention, and vice versa.

The embodiments described in this specification and the accompanying drawings are merely illustrative of some of the technical ideas included in the present invention. Accordingly, since the embodiments disclosed in the present specification are not intended to limit the technical idea of the present invention, but are for illustrative purposes, it is obvious that the scope of the technical idea of the present invention is not limited by these embodiments. Modifications and specific embodiments that can be easily inferred by those skilled in the art within the scope of the technical spirit included in the specification and drawings of the present invention should be interpreted as being included in the scope of the present invention.

DESCRIPTION OF SYMBOLS

100: data collection unit
200: frequency band setting unit
300: filtering unit
400: waveform dividing unit
500: phase shift unit
600: waveform calculation unit
700: correlation calculation unit
800: Rayleigh wave orientation determination unit
900: orientation comparison unit
1000: result calculation unit

What is claimed is:

1. A method to determine an azimuthal orientation of a borehole seismometer sensor performed by a computing device, the method comprising:
    collecting continuous waveform of a Rayleigh wave measured by a borehole seismometer;
    shifting phase of a vertical component of the continuous waveform by 90 degrees;
    calculating a horizontal component of the continuous waveform for a plurality of angles;
    calculating correlation coefficients of the vertical component and the horizontal component of the continuous waveform by [equation 1] for each of the plurality of angles;
    determining an angle having the largest correlation coefficient among the plurality of angles as a first orientation angle of the Rayleigh wave;
    adjusting with an adjustor, the azimuthal orientation of the borehole seismometer sensor based on the first orientation angle;
    wherein [equation 1] is:

$$C(\alpha) = \frac{\int Z'(t) R_\alpha(t) dt}{\sqrt{\int [Z'(t)]^2 dt} \sqrt{\int [R_\alpha(t)]^2 dt}}$$

wherein $C(\alpha)$ is a correlation coefficient between the horizontal component $R_\alpha(t)$ and the 90° phase-shifted vertical component seismic waveform $Z'(t)$.

2. The method to determine an azimuthal orientation of a borehole seismometer sensor of claim 1, further comprising determining a second orientation angle of the Rayleigh wave measured by a surface seismometer.

3. The method to determine an azimuthal orientation of a borehole seismometer sensor of claim 2, wherein the determining an azimuthal orientation of the borehole seismometer sensor is a step of determining an azimuthal orientation of the borehole seismometer sensor based on a difference between the first orientation angle and the second orientation angle of the Rayleigh wave.

4. The method to determine an azimuthal orientation of a borehole seismometer sensor of claim 1, wherein the correlation coefficient is a value indicating the degree of identity between the vertical component and the horizontal component.

5. The method to determine an azimuthal orientation of a borehole seismometer sensor of claim 1, further comprising setting an analysis frequency band in the continuous waveform.

6. The method to determine an azimuthal orientation of a borehole seismometer sensor of claim 5, wherein the setting an analysis frequency band is a step of setting a frequency band in which microseism energy in the continuous waveform is equal to or greater than a reference value as the analysis frequency band.

7. The method to determine an azimuthal orientation of a borehole seismometer sensor of claim 1, further comprising bandpass filtering the continuous waveform.

8. The method to determine an azimuthal orientation of a borehole seismometer sensor of claim 1, further comprising dividing the continuous waveform into a plurality of time units.

9. The method to determine an azimuthal orientation of a borehole seismometer sensor of claim 8, further comprising calculating the correlation coefficient for each of the plurality of time units.

10. The method to determine an azimuthal orientation of a borehole seismometer sensor of claim 9, further comprising calculating an average correlation coefficient by averaging the correlation coefficient for each of the plurality of time units.

11. The method to determine an azimuthal orientation of a borehole seismometer sensor of claim 10, wherein the determining a first orientation angle of the Rayleigh wave is a step of determining an angle having the largest average correlation coefficient among the plurality of angles as a first orientation angle.

12. A system to determine an azimuthal orientation of a borehole seismometer sensor, the system comprising:
    a collector for collecting continuous waveform of a Rayleigh wave measured by a borehole seismometer;
    a shifter for shifting phase of a vertical component of the continuous waveform by 90 degrees;
    a calculator for calculating a horizontal component of the continuous waveform for a plurality of angles, and calculating correlation coefficients of the vertical component and the horizontal component of the continuous waveform by [equation 1] for each of the plurality of angles; and
    an adjuster for determining an angle having the largest correlation coefficient among the plurality of angles as a first orientation angle of the Rayleigh wave and adjusting an azimuthal orientation of the borehole seismometer sensor based on the first orientation angle;
wherein [equation 1] is $$C(\alpha) = \frac{\int Z'(t)R_\alpha(t)dt}{\sqrt{\int [Z'(t)]^2 dt}\sqrt{\int [R_\alpha(t)]^2 dt}}$$

wherein $C(\alpha)$ is a correlation coefficient between the horizontal component $R_\alpha(t)$ and the 90° phase-shifted vertical component seismic waveform $Z'(t)$.

13. The system to determine an azimuthal orientation of a borehole seismometer sensor of claim 12, wherein the determinator determines a second orientation angle of the Rayleigh wave measured by a surface seismometer and determines an azimuthal orientation of the borehole seismometer sensor based on a difference between the first orientation angle and the second orientation angle of the Rayleigh wave.

* * * * *